United States Patent
Yazdanbakhsh et al.

(10) Patent No.: US 11,491,495 B2
(45) Date of Patent: Nov. 8, 2022

(54) SELF-CLEANING MAGNETIC FILTER

(71) Applicant: Tartan Energy Group, Inc., Calgary (CA)

(72) Inventors: Farzad Yazdanbakhsh, Calgary (CA); Wai Lim Chu, Calgary (CA)

(73) Assignee: Tartan Energy Group, Inc., Calgary (CA)

( * ) Notice: Subject to any disclaimer, the term of this patent is extended or adjusted under 35 U.S.C. 154(b) by 346 days.

(21) Appl. No.: 16/848,897

(22) Filed: Apr. 15, 2020

(65) Prior Publication Data
US 2021/0322999 A1  Oct. 21, 2021

(51) Int. Cl.
| B03C 1/28 | (2006.01) |
| B03C 1/033 | (2006.01) |
| B03C 1/30 | (2006.01) |
| B01D 46/79 | (2022.01) |
| B01D 46/04 | (2006.01) |
| B01D 46/00 | (2022.01) |

(52) U.S. Cl.
CPC .......... *B03C 1/284* (2013.01); *B01D 46/0034* (2013.01); *B01D 46/04* (2013.01); *B01D 46/79* (2022.01); *B03C 1/0332* (2013.01); *B03C 1/286* (2013.01); *B03C 1/30* (2013.01); *B03C 2201/22* (2013.01)

(58) Field of Classification Search
None
See application file for complete search history.

(56) References Cited

U.S. PATENT DOCUMENTS

| 4,529,516 A | | 7/1985 | Nolan | |
| 5,043,063 A | | 8/1991 | Latimer | |
| 5,055,190 A | * | 10/1991 | Hayes | B03C 1/286 |
| | | | | 210/222 |
| 5,470,466 A | | 11/1995 | Schaaf | |
| 6,077,333 A | * | 6/2000 | Wolfs | B03C 1/288 |
| | | | | 210/695 |
| 7,504,032 B2 | | 3/2009 | Tashiro | |
| 7,976,704 B2 | | 7/2011 | Tashiro | |
| 9,901,931 B2 | | 2/2018 | Yen et al. | |
| 10,245,535 B2 | | 4/2019 | McLane et al. | |
| 10,537,835 B2 | | 1/2020 | Chen | |
| 2011/0062064 A1 | | 3/2011 | Tashiro | |

* cited by examiner

*Primary Examiner* — David C Mellon
(74) *Attorney, Agent, or Firm* — Lewellyn Law, PLLC; Stephen Lewellyn

(57) ABSTRACT

A self-cleaning magnetic filter for removing ferrous contaminates from a natural gas process stream including a housing through which the process stream follows for removing ferrous contaminates in the process stream by magnetic attraction with a plurality of magnetic bars that are removably disposed in a plurality of non-magnetic sleeves disposed within the housing. A recirculating washing solution is used to flush contaminates that adhere to the exterior surfaces of the non-magnetic sleeves and from the housing. A bag filter is used to remove contaminates from the washing solution to allow recycling the washing solution.

7 Claims, 3 Drawing Sheets

SELF-CLEANING MAGNETIC FILTER

FIELD OF THE INVENTION

The present invention relates to magnetic filters for removing magnetic contaminants from natural gas process streams in refinery industries.

BACKGROUND OF THE INVENTION

Magnetic filters used for removing magnetic material from process streams are known. For example, U.S. Pat. No. 9,901,931 to Yen et al. describes magnetic filters having permanent magnetic bars that are removably disposed within non-magnetic sleeves and packing material or matrices disposed within the interior region of the filter. Examples of magnetic filters that also use packing material or matrices are explained by U.S. Pat. No. 3,539,509 to Heitmann et al., and U.S. Pat. No. 5,766,450 to Heitmann et al. Some magnetic filters use scrapers for removing collected magnetic material from magnetic bars, such as, for example the filter described by U.S. Pat. No. 10,537,835.

Employing magnetic filters for removing magnetic contaminants from natural gas process streams presents challenges. For example, a sticky mixture is often formed in natural gas process streams that is left on the surfaces of processing equipment due to a combination of heavy hydrocarbons such as wax and asphaltenes and contaminants such as lubrication oil that is carried with the natural gas. This sticky mixture clogs the packing material or matrices of existing magnetic filters, rendering them inoperable in relatively short time, thereby by requiring frequent servicing. Further, manual cleaning of magnetic filters in natural gas treating or processing facilities is undesirable as natural gas often contains toxic compounds such as hydrogen sulfide. Additionally, mechanical cleaning of magnetic filters by scrapers, for example, presents a fire hazard in natural gas systems.

SUMMARY OF THE INVENTION

Embodiments of the present invention provided a new magnetic filter than can be used to remove ferrous contaminants from a natural gas process stream and that overcomes the drawbacks found in existing magnetic filters that make them undesirable for use in natural gas processing.

In general, in one aspect, an embodiment is directed toward a magnetic filter for separating ferrous contaminants from a contaminated natural gas process stream. The magnetic filter includes a housing having a process stream inlet, a process stream outlet, a drain opening, and defines an interior region. A plurality of non-magnetic sleeves are positioned within the housing, each having a chamber for removably receiving a magnetic bar therewithin and an exterior surface. A plurality of magnetic bars are supported for movement relative to the plurality of non-magnetic sleeves between a first position wherein the magnetic bars are disposed within the chambers of the sleeves and a second position wherein the magnetic bars are withdrawn from the chambers of the sleeves. A plurality of spray nozzles each have an outlet directed toward the exterior surfaces of the non-magnetic sleeves. The magnetic filter further includes a bag filter, a fluid storage tank for holding a quantity of a wash solution, and a pump for pumping the wash solution. The draining opening, the bag filter, the fluid storage tank, the pump, and the plurality of spray nozzles are fluidically connected together for circulating a wash solution from the fluid storage tank, through the plurality of spray nozzles, into the interior region of the housing, through the drain opening, through the bag filter and back into the storage tank for flushing contaminants from the exterior surfaces of the non-magnetic sleeves and from the interior region of the housing.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
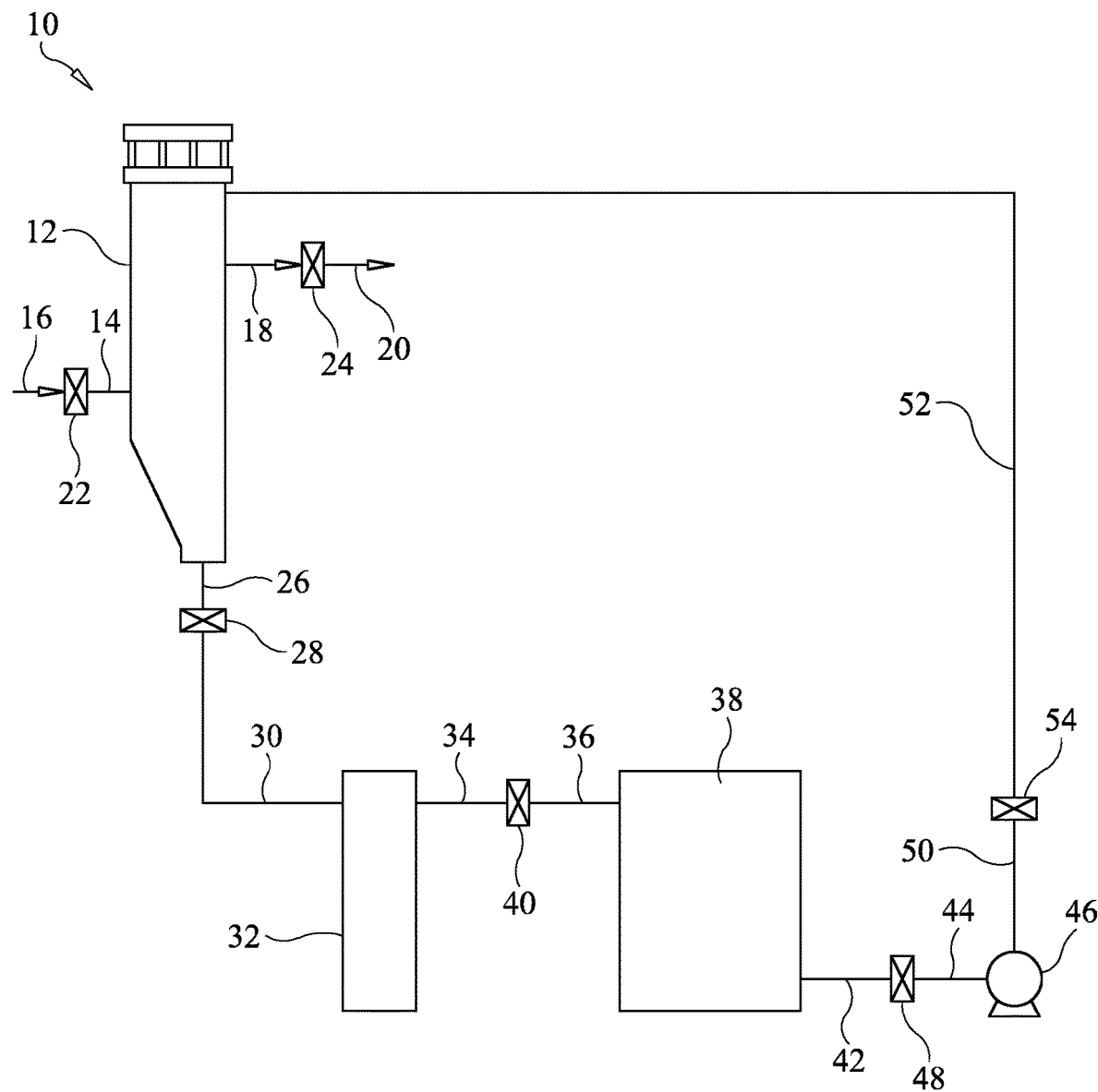
FIG. 1 is a diagrammatic view of a magnetic filter constructed in accordance with an embodiment of the invention.

In FIG. 1 there is diagrammatically shown a magnetic filter 10. The filter 10 includes a fluidically sealed housing 12 having a process flow inlet pipe 14 connected to a contaminated process stream 16 and an outlet pipe 18 from which a treated process stream 20 exits the housing. A control valve 22 may be connected to the inlet pipe 14 and a control valve 24 may be connected to the outlet pipe 16 and operated to regulate the flow through the inlet pipe and outlet pipe, respectively. A drainpipe 26 is connected to the bottom of the housing 12, the flow through the drainpipe 26 is regulated by control valve 28, which is normally closed during filtration operation, but which is opened during a cleaning operation. The size of the opening in the drainpipe 26 is large enough to accommodate large particles that accumulate in the housing during a filtering operation so that contaminants can be flushed from the housing through the drainpipe.

Filter 10 further includes a bag filter 32. Bag filters are readily known by those of ordinary skill in the art, accordingly there is no need to explain the structure and function of a bag filter herein. One of ordinary skill in the art is capable of selecting a desirable bag filter 32. Drainpipe 26 is connected at its end opposite of housing 12 to an inlet 30 of the bag filter 32 and an outlet 34 of the bag filter 32 is connected to an inlet 36 of a fluid storage tank 38. A control valve 40 is connected between the outlet 34 and inlet 36 and is operated to regulate a flow of fluid from the bag filter 32 to the storage tank 38. The storage tank 38 is designed to hold a quantity of cleaning fluid or solution that is used to flush contaminates from the housing 12.

An outlet 42 of the storage tank 38 is connected to an inlet 44 of a pump 46. A control valve 48 is connected between the outlet 42 and inlet 44 to regulate the flow rate of solution from the storage tank 38 to the pump inlet 44.

The discharge 50 of the pump 46 is connected to flow pipe 52, which is connected to a plurality of fluid nozzles, as is further described herein below. A control valve 54 may be connected between the discharge 50 and the flow pipe 52 or may be disposed along the flow pipe and operated to regulate the flow rate of fluid flowing through the flow pipe from pump 46.

Figure 2:
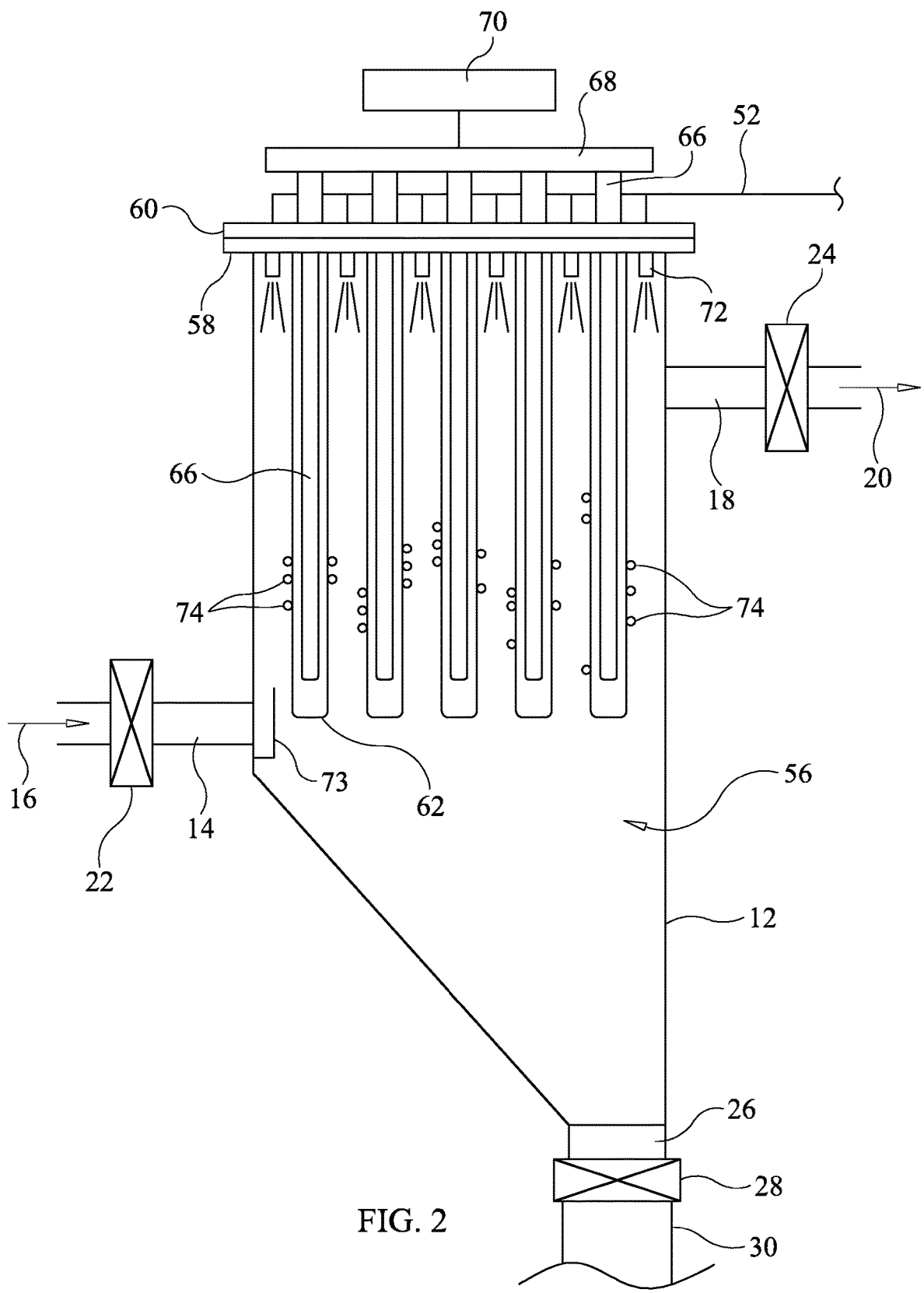
FIG. 2 is a diagrammatic view of a housing forming part of the magnetic filter of FIG. 1.
Figure 3:
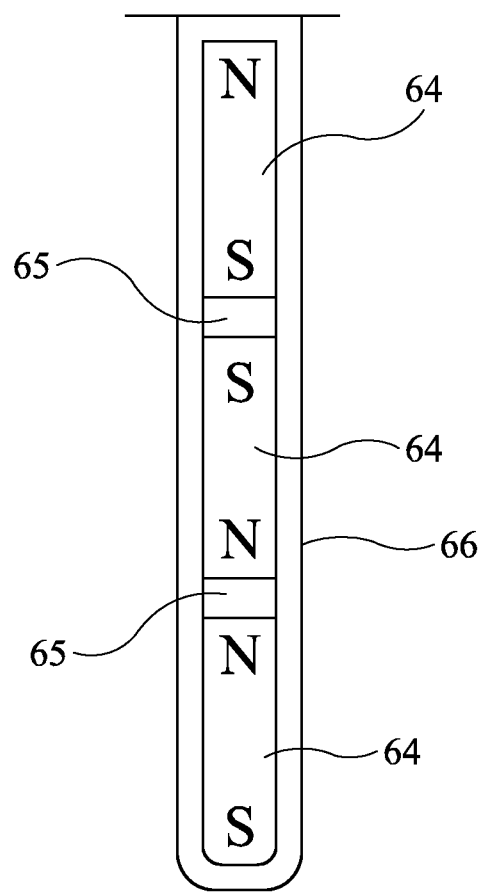
FIG. 3 is a diagrammatic view of a magnetic bar used in the magnetic filter of FIG. 1.

Turning to FIG. 2, housing 12 defines an interior region 56 through which a process stream flows for decontamination of ferrous material. The top of the housing has a flange 58 to which is removably attached a cover plate 60. A plurality of vertically oriented elongated sleeves 62 are attached to the cover plate 60. The tops of the sleeves 62 extend through the cover plate and are open, while the bottom ends are closed and are disposed within the interior region 56. Each sleeve 62 is constructed of a non-magnetic material such as stainless steel and each has a chamber that accommodates a magnetic bar 66. Each sleeve 62 is sealed from the interior region 56 so that no process fluid can enter the sleeve. The magnetic bar 66 may include several magnets 64 that are encased to form the magnetic bar, as shown in FIG. 3. There maybe spacers 65 between the magnets 64 to facilitate their separation/removal.

The magnetic bars 66 are mounted to be moved relative to the sleeves 62 so that the magnetic bars can be inserted into and withdrawn from the sleeves. As diagrammatically shown, the magnetic bars 66 can be attached to a support 68 which in turn is operatively connected to an actuator 70 that is operated to raise and lower the support to insert or remove the bars from the sleeves 62. The actuator 70 maybe a linear actuator such as, for example, a hydraulic or electrically operated lift. The actuator 70 can also be of various other constructions so long as it serves its purpose of moving the support 68 toward and way from the top of the housing 12.

As further depicted, there are a plurality of wash nozzles 72 arranged with their outlets disposed in the interior region 56 of the housing 12, generally at the top, thereof. The nozzles 72 may be sealing mounted to the cover plate 60 and extend downwardly into the interior region 56. Each nozzle 72 is connected to flow pipe 52 that is connected to the discharge of the pump 46 to receive a high-pressure flow of fluid therefrom.

Importantly, the interior region 56 is completely free of any packing material or matrices that are typically found in existing magnetic filters for the purpose of capturing non-magnetic particles from the process stream. Such material or matrices are undesirable here because the magnetic filter 10 is intended to be used in removing ferrous contaminants from a natural gas process stream. Natural gas process streams include many compounds that form a sticky substance that quickly clog the packing material or matrices making such filters inoperable with natural gas process streams.

The magnetic filter 10 has two primary modes of operation. The first being a contamination removal operation and the second being a contamination flush operation. In the contamination removal operation, the magnetic bars 66 are fully inserted into the sleeves 62. A contaminated natural gas process stream 16 enters inlet 14 and flows into the interior region 56. A baffle 73 may aid in distributing the process stream in the interior region to contact the sleeves. The strong magnetic field created by the magnetic bars 66 attract ferrous contaminants 74 within the process stream and causes them to deposit onto the outer surfaces of the sleeves. A treated process stream 20 that is substantially free of ferrous contaminants then exists the housing 12 through outlet 18.

As more contaminants coat the exterior surfaces of the sleeves 62, it is desirable to flush the contaminants off the sleeves and from within the housing 12. The cleaning and flushing are accomplished by the contamination flush operation. In the flush operation, valves 22 and 24 are operated to close the inlet 14 and outlet 18, respectively. Valve 28 is operated to open the drainpipe 26. The magnetic bars 66 are lifted and removed from the sleeves by operating the actuator 70, thereby causing a portion of the contaminants that have been deposited on the outer surfaces of the sleeves to release from the surfaces. Valves 40, 48, 54 and the pump 46 are operated causing a flushing solution held in tank 38 to flow through the cleaning nozzles 72, wherein the cleaning nozzles spray, under pressure, the flushing solution on the outer surfaces of the sleeves 62 to further remove contaminants from the surfaces and to flush them from the interior region 56 of the housing 12. The flushing solution, carrying the contaminates flows through the bag filter 32 where the contaminates are removed from the flushing solution and then free of contaminates returns to the storage tank 38. The flushing solution is circulated in this manner for a desired period to allow thorough flushing of the contaminates from the outer surfaces of the sleeves 62 and the interior region 56.

Once the flushing cycle or operation is completed, the pump 46 is stopped, valve 28 is operated to close the drainpipe 26, and valves 40, 48, and 54 may be operated as desired to either stay open or close. Next, the magnetic bars 66 are lowered into the respective sleeves 62 by operation of the actuator 70. Once the magnetic bars 66 are lowered, valves 22 and 24 are operated to open the inlet 14 and the outlet 18, respectively, thereby allowing, once again, the flow of the process stream through the housing 12.

Several embodiments of the present invention have been described. Nevertheless, it will be understood that various modifications may be made without departing from the spirit and scope of the invention. Accordingly, other embodiments are within the scope of the following claims.

What is claimed is:

1. A magnetic filter for separating ferrous contaminants from a contaminated natural gas process stream, the magnetic filter comprising:

a housing having a process stream inlet, a process stream outlet, a drain opening, and defines an interior region;

a plurality of non-magnetic sleeves positioned within the housing, each of the sleeves having a chamber for removably receiving a magnetic bar therewithin and an exterior surface;

a plurality of magnetic bars supported for movement relative to the plurality of non-magnetic sleeves between a first position wherein the magnetic bars are disposed within the chambers of the sleeves and a second position wherein the magnetic bars are withdrawn from the chambers of the sleeves;

a plurality of spray nozzles having outlets directed toward the exterior surfaces of the non-magnetic sleeves;

a bag filter;

a fluid storage tank for holding a quantity of a wash solution;

a pump for pumping the wash solution; and wherein the drain opening, the bag filter, the fluid storage tank, the pump, and the plurality of spray nozzles are fluidically connected together for circulating a wash solution from the fluid storage tank, through the plurality of spray nozzles, into the interior region of the housing, through the drain opening, through the bag filter and back into the storage tank for flushing contaminates from the exterior surfaces of the non-magnetic sleeves and from the interior region of the housing.

2. The magnetic filter of claim 1, wherein the housing comprises an upper opening that is sealed with a cover plate.

3. The magnetic filter of claim 2, wherein the plurality of magnetic bars can be withdrawn from each of the sleeves without having to remove the cover plate.

4. The magnetic filter of claim 2, wherein one or more of the plurality of spray nozzles are mounted to the cover plate.

5. The magnetic filter of claim 1, wherein the interior region of the housing is free of packing material or matrices.

6. A magnetic filter for separating ferrous contaminants from a contaminated natural gas process stream, the magnetic filter comprising:

a housing having a process stream inlet, a process stream outlet, a drain opening, an upper opening and defines an interior region that is free of packing material or matrices;

a cover plate removably attached to the housing to seal the upper opening;

a plurality of non-magnetic sleeves positioned within the housing, each of the sleeves having a chamber for removably receiving a magnetic bar therewithin and an exterior surface;

a plurality of magnetic bars supported for movement relative to the plurality of non-magnetic sleeves between a first position wherein the magnetic bars are disposed within the chambers of the sleeves and a second position wherein the magnetic bars are withdrawn from the chambers of the sleeves without removing the cover plate;

a plurality of spray nozzles having outlets directed toward the exterior surfaces of the non-magnetic sleeves;

a bag filter;

a fluid storage tank for holding a quantity of a wash solution;

a pump for pumping the wash solution; and wherein the drain opening, the bag filter, the fluid storage tank, the pump, and the plurality of spray nozzles are fluidically connected together for circulating a wash solution from the fluid storage tank, through the plurality of spray nozzles, into the interior region of the housing, through the drain opening, through the bag filter and back into the storage tank for flushing contaminates from the exterior surfaces of the non-magnetic sleeves and from the interior region of the housing.

7. The magnetic filter of claim 6, wherein one or more of the plurality of spray nozzles are mounted to the cover plate.

* * * * *